US009049275B1

(12) United States Patent
Newman

(10) Patent No.: US 9,049,275 B1
(45) Date of Patent: Jun. 2, 2015

(54) TELEPHONE COMMUNICATION SYSTEM AND METHOD OF USING

(76) Inventor: Paul Newman, Eau Claire, WI (US)

( * ) Notice: Subject to any disclaimer, the term of this patent is extended or adjusted under 35 U.S.C. 154(b) by 1738 days.

(21) Appl. No.: 12/145,316

(22) Filed: Jun. 24, 2008

(51) Int. Cl.
*H04M 1/66* (2006.01)
*H04M 9/00* (2006.01)

(52) U.S. Cl.
CPC .............. *H04M 9/001* (2013.01); *H04M 9/002* (2013.01)

(58) Field of Classification Search
CPC ....... H04M 3/436; H04M 3/42; H04M 3/465; H04M 3/54; H04M 3/46; H04M 9/001; H04M 9/002; H04M 1/70; H04M 1/723; H04Q 2213/13103; H04Q 3/0016; H04Q 3/00
USPC ................ 379/201.01, 258, 211.04, 168, 184
See application file for complete search history.

(56) References Cited

U.S. PATENT DOCUMENTS

| | | | |
|---|---|---|---|
| 4,805,210 A | 2/1989 | Griffith | |
| 4,899,372 A | 2/1990 | Wahi | |
| 5,444,772 A | 8/1995 | Coker | |
| 5,559,873 A | 9/1996 | Wood | |
| 5,954,800 A * | 9/1999 | Jung et al. | 709/250 |
| 6,035,211 A * | 3/2000 | Rabe et al. | 455/567 |
| 6,643,365 B1 | 11/2003 | Dunn et al. | |
| 6,959,172 B2 | 10/2005 | Becker et al. | |
| 7,221,950 B2 | 5/2007 | Frank et al. | |
| 7,274,782 B2 | 9/2007 | Forte | |
| 7,292,879 B2 * | 11/2007 | Cho | 455/567 |
| 8,477,923 B2 * | 7/2013 | Goldman et al. | 379/212.01 |
| 2006/0072542 A1 * | 4/2006 | Sinnreich et al. | 370/351 |
| 2007/0070183 A1 * | 3/2007 | Davis | 348/14.02 |
| 2007/0281703 A1 * | 12/2007 | Shkedi | 455/445 |
| 2009/0171684 A1 | 7/2009 | Samolinski et al. | 705/1 |
| 2009/0225975 A1 * | 9/2009 | Han | 379/211.04 |
| 2009/0325587 A1 * | 12/2009 | Suginaka et al. | 455/450 |
| 2011/0167480 A1 * | 7/2011 | Kumar et al. | 726/4 |
| 2011/0208529 A1 * | 8/2011 | Jeal et al. | 705/1.1 |

FOREIGN PATENT DOCUMENTS

EP 1 146 764 A2 10/2001

OTHER PUBLICATIONS

Ascendent Systems, The PBX Goes Mobile, Extending Fixed Mobile Convergence Out to the Mobile Workforce, pp. 1-11.

* cited by examiner

*Primary Examiner* — Rasha Al Aubaidi
(74) *Attorney, Agent, or Firm* — Anthony J. Bourget

(57) ABSTRACT

A telephone communication system for reducing the number telephone of assigned numbers while allowing for increased availability of individuals and method of using the telephone communication system. The telephone communication system has at least two telephones and each telephone may be placed in activated mode or in the alternative, stand-by mode. The at least two telephones have one and only one active calling number per device and the active calling number for each device is identical to the calling number of the other device(s). A switch is capable of transferring a call from a previously activated phone to a newly activated phone utilizing an on-the-fly-redirect feature.

28 Claims, 4 Drawing Sheets

TELEPHONE COMMUNICATION SYSTEM AND METHOD OF USING

BACKGROUND OF THE INVENTION

1. Field of the Invention

The present invention relates generally to a telephone communication system and method of use, and more specifically to a system and method of use where a single calling number is assigned to multiple telephone devices.

2. Background Information

With improving technological advances in the electronic location devices art, people are expected to be reachable at any location and at any time. For this purpose it is known for people to have many means of communications, such as a home telephone, a personal wireless telephone, a pager, a work wireless telephone, an office telephone, a computer, a car telephone, etc.

When a person or family or business or group of people have one or all of these methods of communication, it is increasingly difficult to know how to best reach the intended person, family or group. One known option for locating one of these persons, families or groups is by call forwarding. Call forwarding may work in two separate manners. In the first type of call forwarding incoming calls to an original phone number are forwarded to a phone associated with a second number. The phone associated with the second number rings as if the call were to the second number. The phone associated with the original number will beep once indicating to a user that the calls to that number are being forwarded to another number. Calls may be made from the phone associated with the original number, but call may not be received at that phone.

The second type of call forwarding works by having a telephone system that allows a user to enter other numbers to which a call is forwarded if the user knows they will not be at or be able to pick up a specific phone. Although convenient for locating someone, this type of call forwarding may result in the caller staying on the line for a long period of time, requires each phone to have call forwarding capabilities, only allows a message to be left with the telephone of the final calling number the call is forwarded to and requires each telephone or communication device to have a separate and distinct 10-digit calling number.

U.S. Pat. No. 7,274,782 to Forte attempts to solve some of the complications of call forwarding noted above. Forte provides a system for establishing communication with a plurality of telephone devices, having multiple telephone numbers, after a caller has called a central telephone number. This system is advantageous over call forwarding because it allows for users to pick up the incoming call at any telephone that has a calling number associated with the central calling number. Further, Forte's system allows for outgoing calls to be made from one of the telephone devices that have a calling number associated with the central number in order to decrease long distance costs if the user is traveling outside of a local calling area.

However, both call forwarding and Forte's system require each telephone device to have a separate telephone number. The number of telephone numbers has increased substantially in recent years as more types of communication devices are made available. This creates at least two problems. First, the increase of calling numbers results in one person having to commit many different 10-digit calling numbers to memory in order to either quickly provide others with their numbers or in order to be able to quickly contact other people. Second, with an increasing amount of numbers being used and associated with each new communication device, and no end in sight for the distribution of calling numbers, it is a real problem that the community will use all available 10-digit numbers.

Further, it is known to have a single number assigned to multiple telephone devices. In European Patent Application, EP 1,146,764 A2 to Duerk, Duerk discloses multiple wireless units with the same telephone number. In Duerk, only one telephone number is assigned to multiple wireless units having separate Electronic Serial Numbers (ESNs), which reduces the number of telephone numbers and allows for multiple users to answer an incoming call or join an outgoing call. In addition to the system of Duerk, it is known for large businesses to have internal systems that involve using a landline device and a mobile device in conjunction with one another while having one and only one calling number for the two devices. While the prior art has provided examples of improved systems for locating a person, family or group, there is always room for further improvement.

SUMMARY OF THE INVENTION

The known systems for locating an individual or group do provide for privacy on a communication line. However, the known systems for reducing the number of telephone numbers do not provide for privacy on the line. People have not viewed this as a problem but, rather, a fact of life. The present inventor, however, has recognized that it is possible to improve the chances of locating an individual or group, while reducing the number of calling numbers in use and allowing for complete privacy of any call.

In accordance with an aspect of the invention, the increasing availability of a person or a group and reduction in calling numbers can be achieved simultaneously by providing multiple devices having the same telephone number. This results in at least two of the multiple devices having one and only one identical active calling numbers. Further, one of the multiple devices having identical calling numbers is capable of being placed on activated mode while the other multiple devices having identical calling numbers are placed on stand-by mode and are not considered to be in active mode.

In accordance with a further aspect of the invention, the device that is activated will alert a user of an incoming call with a first ringtone assigned by the user. The stand-by devices will alert the users of an incoming call, but that stand-by device is on "stand-by" with a second ringtone, different from the first ringtone, assigned by the users.

In accordance with a yet further aspect of the invention, it is possible, at any time prior to answering a call or after disconnecting a call, to change which one of the multiple devices with the same calling number is activated and which ones are on stand-by. This is done by entering a code into a device or through a switch means or Personal Identification Number (PIN). Accordingly, it is possible to have on-the-fly redirection during an incoming call, resulting in the telephone device that was formerly on stand-by becoming activated in order to allow the user to answer the call. This will also result in the formerly activated device being placed on stand-by mode.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1A:
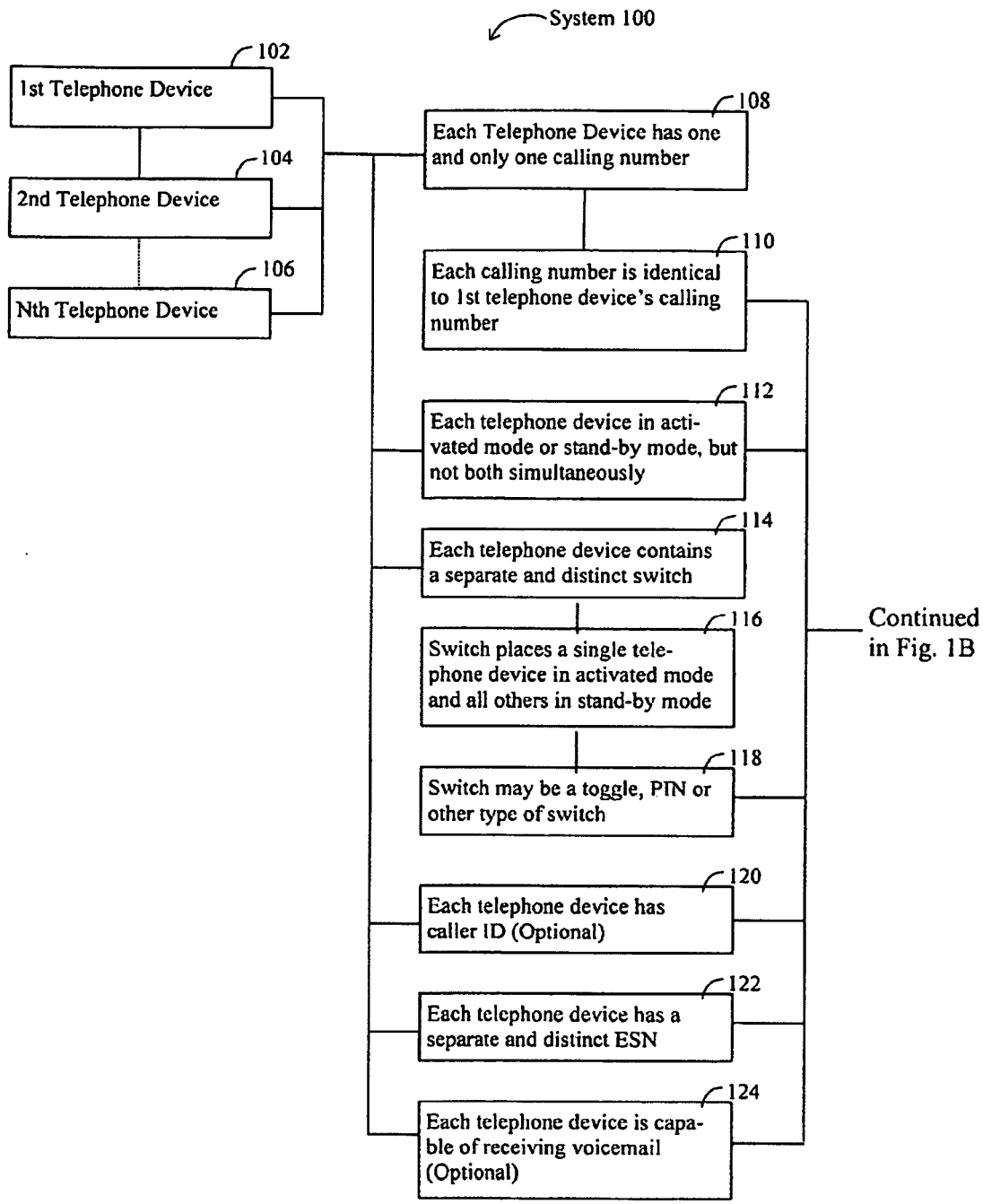
FIGS. 1A and 1B is a flowchart of a telephone communication system embodying principles of the present invention.

While the invention is amenable to various modifications and alternative forms, specifics thereof have been shown by way of example in the drawings and will be described in detail. It should be understood, however, that the intention is not necessarily to limit the invention of the particular embodiments described. On the contrary, the intention is to cover all modifications, equivalents, and alternatives falling within the spirit and scope of the invention and as defined by the appended claims.

DETAILED DESCRIPTION OF THE DRAWINGS

Figure 1B:
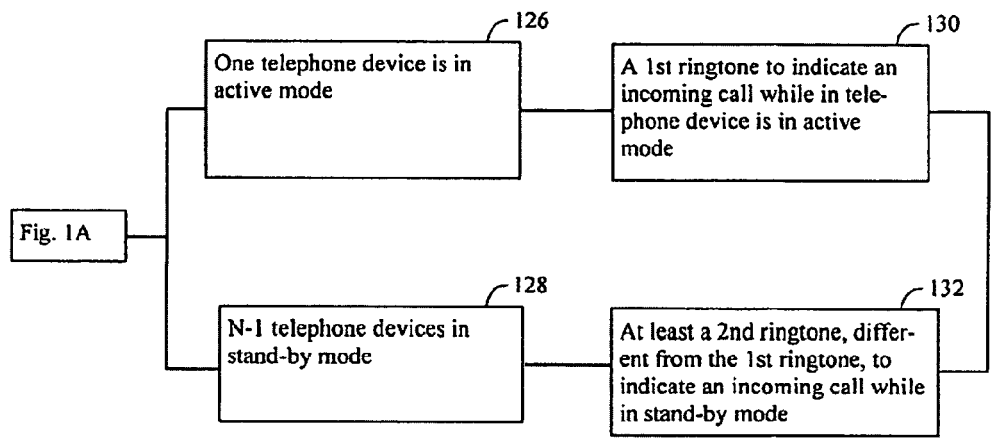

Referring now to the Figures, a telephone communication system 100 in accordance with one embodiment of the invention is depicted in FIG. 1. In one aspect, a first telephone 102 capable of being placed in both active and stand-by mode, but not both modes simultaneously 112 and having one and only one active calling number 108 is provided. In addition, a second telephone 104 capable of being in both active and stand-by mode, but not both modes simultaneously 112 and having one and only one active calling number 108 is provided. The one and only one active calling number 108 of the second telephone 104 is identical 110 to the one and only one designated calling number 110 of the first telephone 102. Thus, each telephone is capable of receiving calls pertaining to one and only one calling number at a time. In one embodiment of the invention, a phone may have multiple calling numbers associated with it (e.g., where a phone is equipped with multiple SIM cards at one time), however, under at least one embodiment of the present invention, only one of such calling numbers may be active or operational at any given time (i.e., there is "one and only one active calling number" per telephone device). Thus, while a phone may be equipped to make calls from multiple calling numbers, only one of such calling numbers may be operational at a given time and thus even such phone (i.e., one having multiple SIM cards) has one and only one active calling number.

It is possible to have N telephone devices 106 in the system 100, where N is 2 or greater. Each of the N telephones are capable of being in active and stand-by mode, but not in the same mode simultaneously 106. In an embodiment of the invention all N telephones in the system must have individual calling numbers 108 and all of the individual calling numbers must be identical 110. Each of the N telephone devices 106 can be any of a landline telephone, cellular telephone, SIM card placed in a cellular telephone, satellite telephone, computer, car telephone, etc. and equivalents thereof. Of the N telephone devices 106 in the system one phone will be activated 126 and N−1 telephone devices will be on stand-by 128. All N telephone devices 106 may receive caller identification (ID) on each call 120 (telephone device permitting), whether or not the telephone device is activated or on stand-by.

Each telephone device 106 contains a separate and distinct switch 114. This switch 114 is capable of activating the telephone device it is associated with 126, which results in placing all other system telephone devices 128 in stand-by mode 116. In another embodiment the switch 114 may be capable of placing the activated phone in stand-by mode and one of the phones previously in stand-by mode in activated mode. In yet another embodiment, each device 106 may have two switches, one for placing a phone on activated mode while in stand-by mode and one for placing a phone in stand-by mode when in activated mode. Further, one switch 114 may be capable of placing a phone in activated mode while in stand-by mode and placing a stand-by phone in activated mode. A device 106 in stand-by mode 128 is not capable of making outgoing calls or answering incoming calls without being switched to activated mode 126. The switch located on each of the N telephone devices 106 in the system 100 can be of numerous types, including, but not limited to a toggle switch, a Personal Identification Number (PIN), and/or a menu-type switch listing all phones associated with the one and only one identical calling number. If a PIN is used, it may be the same for each of the N telephone devices 106, voice activated switch, or other switch capable of activating one telephone device and placing the rest on stand-by and equivalents thereof 118. The user may assign a ringtone that indicates the phone is activated and that there is an incoming call 130. Also, the user may assign a ringtone to all N telephone devices 106 in the system 100 that indicates the telephone device is in stand-by mode and that there is an incoming call 132, this ringtone is different and distinct from the ringtone indicating the telephone is activated and there is an incoming call.

A telephone device 106 of the system 100 may be switched from being in stand-by mode to active mode at any time 112. This includes the feature that a telephone device 106 of the system 100 may be switched from stand-by to activated mode while there is an incoming call, during a call, before and after a call or any time occurrence possible in regard to an incoming or outgoing call. When switching of modes occurs during an incoming call it is referred to as "on-the-fly redirection". Any switching of a device 106 from stand-by mode to activated mode or from activated mode to stand-by mode occurs in near real-time. However, it is contemplated that up to two telephone devices 106 may be activated at the same time momentarily so as to facilitate switching a call from a previously activated telephone device 106 to a newly activated telephone device 106. In the event two telephone devices 106 are active at the same time, it is an aspect of the invention to minimize such time two telephone devices 106 are active at the same time.

A further aspect of the invention includes how the on-the-fly-redirect function is performed. Once a user presses a switch to turn a telephone device 106 from stand-by 128 to active mode 126 the telephone device 106 sends a signal to a mobile switching device located at a communication service provider location. A communication service provider is defined as an entity that provides communication services in addition to or other than only communication hardware. The mobile switching device then sends a signal to the previously activated telephone device 106 and places it in stand-by mode 128. In another aspect, the switch on an activated 126 telephone may be pressed, causing another phone to be activated 126 and the previously activated phone to be turned to stand-by mode 128. The switching of which phone 106 is activated 126 results in the call being transferred to the newly activated phone. The call may be transferred to the newly activated phone in one of at least two ways. First, the mobile switching device may place the call on hold and then turn the previously activated telephone device to stand-by and then transfer the call to the newly activated telephone device. Second, the mobile switching device may transfer the call to the newly activated phone while both phones are activated and then the mobile switching device will send a signal to the previously active phone to place it in stand-by mode. Any and all switching occurs nearly simultaneously and therefore, privacy is maintained with either switching method. In addition, switching which telephone device 106 is in active mode 126 may occur as many times as the user deems necessary, no matter if the switching occurs before, during or after a call.

As is required by law each individual telephone device 106 has a distinct Electronic Serial Number (ESN) 122. This will allow for separate billing of each individual telephone device 106 of the system 100, although all telephone devices 106 in the system 100 have the same identical calling number 110. A billing database may be used to track the usage and charges for each telephone device or any associated calling number.

Further, each of the N telephone devices 106 may be capable of receiving voicemail 124, but a caller may leave a message only on the activated telephone device. This is beneficial because it will allow a user to determine at which of the N telephone devices 106 the incoming caller should leave a message. In another embodiment of the invention, it is contemplated that one voicemail, possibly a corporate voicemail, will be assigned to the identical calling number and may be accessed by any and all N devices 106.

Yet further, each of the N telephone devices 106 may be capable of making outgoing telephone calls when in activated mode. Each of the outgoing telephone calls from any of the N telephone devices 106 will originate from the identical calling number 110 assigned to said N telephone devices 106.

Figure 2A:
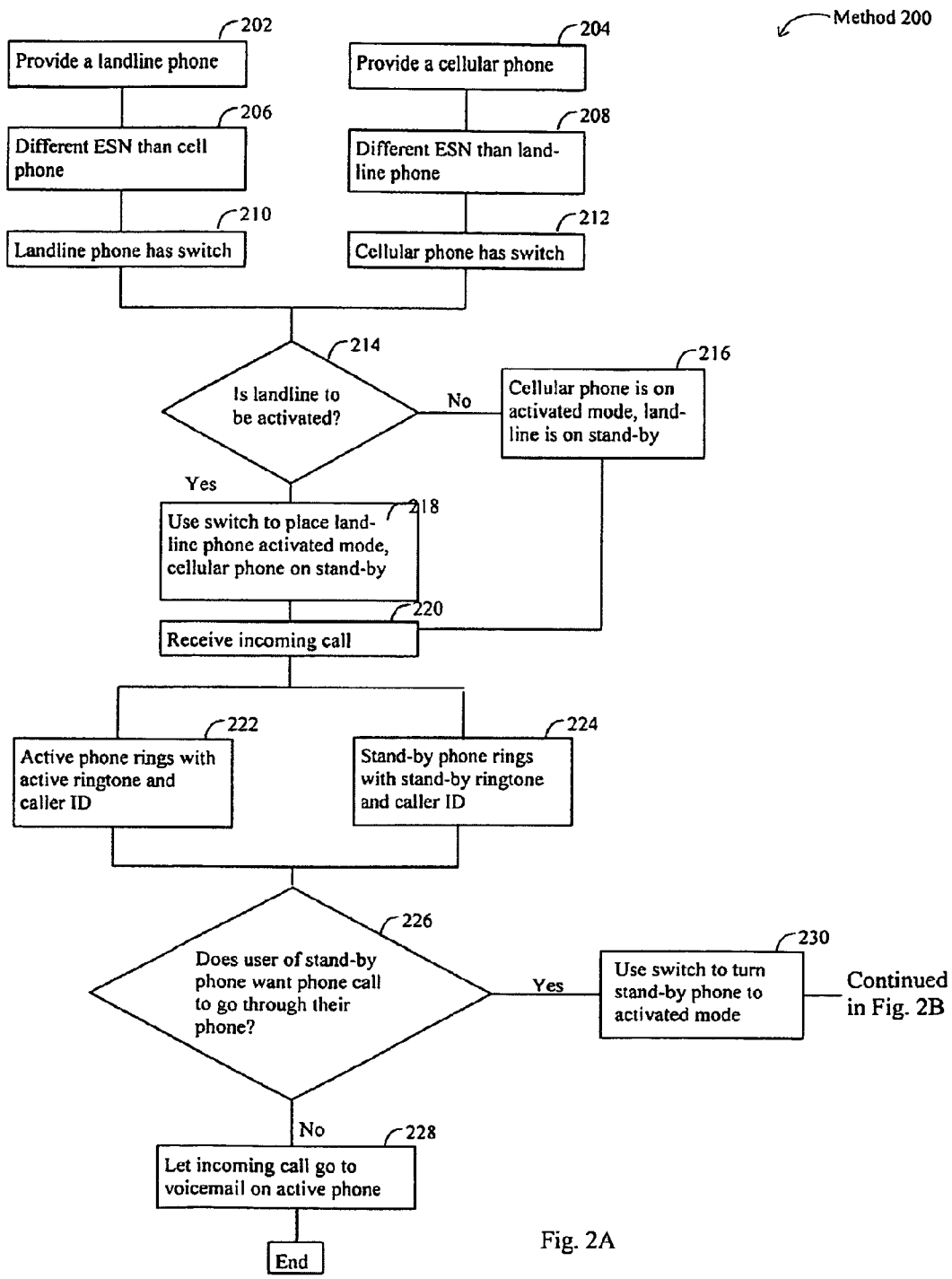
FIGS. 2A and 2B is a flowchart of a method of using a telephone communications system embodying principles of the present invention.
Figure 2B:
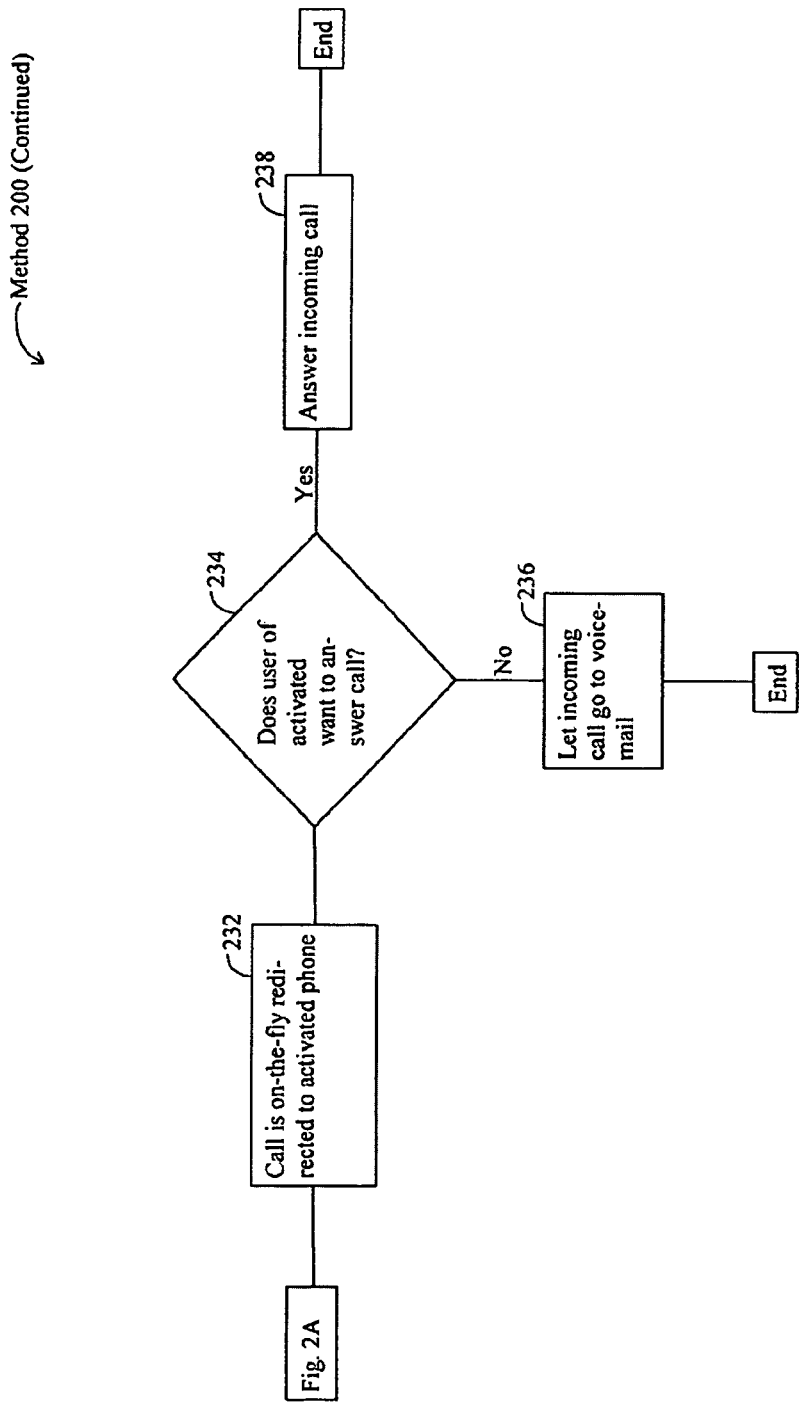

The use of this telephone communication system 100 can be described through an example 200 shown in FIG. 2. This example 200 is only a single aspect of a single embodiment of the invention. A user may have a landline telephone 202 and a cellular telephone 204. Both the landline telephone 202 and the cellular telephone 204 have the same identical 10-digit calling number. In another aspect of the invention, the landline telephone 202 and the cellular telephone 204 may have separate and distinct 10-digit calling numbers. Each of the telephone devices 202, 204 have separate and distinct ESNs 206, 208. In addition, both the landline 202 and cellular telephones 204 have a switch 210, 212 that is capable of activating the respective phone and turning the other phone to stand-by. Either the landline telephone 202, 218 or the cellular telephone 204, 216 is required to be on activated mode 214. In this example, the switch is activated by entering a four-digit PIN (can be the same PIN or different PIN for each phone).

An incoming call is placed to the identical calling number 220. For example purposes, the landline telephone 202 is activated and the cellular telephone 204 is on stand-by 218. However, the user is away from the landline telephone 202 and is unable to hear or answer that telephone, but has the cellular telephone 204 within hearing distance and knows there is an incoming call because the stand-by ring 224 is a separate and distinct ring from the activated ring 222. The user decides 226 to answer the incoming call on the cellular telephone (stand-by phone) 204. User will then use the keypad of the cellular telephone to enter the PIN associated with the cellular telephone in order to activate that phone 230, resulting in the landline phone being placed into stand-by mode. Because of the on-the-fly redirection 232, the user is able to activate the cellular telephone and choose 234 whether to answer the phone call 238 or let it go to voicemail 236. If the user chooses to answer the incoming call, the user answers just as the user would answer any other call 238.

In the above example, if the user were to look at the caller identification on the cellular telephone in stand-by mode 226 and realize that the call should go to voicemail on the landline the user can choose to not answer the incoming call and the landline voicemail will pick up 228. If the user does not want to answer the call after reviewing the caller identification on the cellular telephone 226, 236, but would like the cellular telephone voicemail to pick up the call the user may enter the PIN to activate the cellular telephone 226. Once the PIN is entered the user does not have to answer the call 234 and can let the incoming call go to voicemail on the cellular telephone 236.

Further, it is contemplated that the telephone communication system described above can be used in conjunction with a call forwarding system, of the typical call forwarding-type known in the art or the type considered in the Forte patent. Thus, it is possible to associate another separate and distinct calling number with the identical calling number 110 assigned to the N telephones 106 of the telephone communication system 100 described above to provide a new system. This would allow for maximum availability. For example, if a work cellular telephone was required to have a different calling number than the user's home landline and home cellular telephones' calling number, the combined system would continue to allow for a reduction in the amount of calling numbers in use in the community.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular TELEPHONE COMMUNICATION SYSTEM AND METHOD OF USING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A telephone communication system, comprising:
N telephones, each of said N telephones sharing an identical calling number to receive and place calls;
each of said N telephones configured to be placed in both activated mode and alternatively in stand-by mode such that in stand-by mode a telephone is incapable of placing or receiving a call using the identical active number unless switched to active mode;
each of said N telephones including a switch;
at least one of said switches configured to activate one of said N telephones to be an active mode telephone such that all remaining N−1 telephones are on standby mode prior to making an outgoing call or taking an incoming call, where N is at least two, and where at least one of said standby telephones is configured such that it may be switched to active mode during a telephone call.

2. The system of claim 1, further comprising: each of said N telephones configured to indicate an incoming call whether in active mode or in stand-by mode.

3. The system of claim 2, further comprising:
the indication of an incoming call to a telephone in active mode is different and distinct from the indication of an incoming call to a telephone on stand-by mode.

4. The system of claim 1, further comprising:
each of said N telephones has a separate and distinct electronic serial number.

5. The system of claim 1, further comprising:
each of the N telephones, when individually in active mode, are configured to make outgoing calls originating from the identical calling number.

6. The system of claim 1, further comprising:
said switch is a toggle switch.

7. The system of claim 1, further comprising:
said switch is a personal identification number.

8. The system of claim 1, further comprising:
a mobile switching device,
where said mobile switching device is configured to redirect one from the group of an incoming call, an outgoing call, and a current call from a previously active telephone to a newly activated telephone.

9. The system of claim 8, further comprising:
where said mobile switching device is configured to place said one of an incoming call and current call on hold while transferring said call from said previously activated telephone to said newly activated telephone and turning said previously activated telephone to stand-by mode.

10. The system of claim 8, further comprising:
where said mobile switching device is configured to redirect said one of an incoming call, an outgoing call, and current call from said previously activated telephone to said newly activated telephone and after transferring one of said calls, said mobile switching device places said previously activated telephone in stand-by mode.

11. The system of claim 1 where at least one of said standby telephones is configured such that upon entry of a personal identification number, said at least one standby telephone is switched to active mode before, during or after a telephone call.

12. The system of claim 1 where said active mode telephone is a telephone that is actively on a telephone call.

13. The communication system of claim 1 where said at least one standby phone is configured such that it is incapable of receiving a call or making a call while in standby mode.

14. The communication device of claim 13 where said at least one standby telephone is configured such that said standby telephone is switched to active mode upon entry of the personal identification number at said at least one standby telephone.

15. The system of claim 1 where said at least one standby telephone which is switched to active mode during a call utilizes the identical calling number for that telephone call.

16. A telephone system comprising:
a first telephone and a second telephone, each of said first telephone and said second telephone configured to be placed in either active mode or standby mode;
each of said first telephone and said second telephone having one and only one active calling number, said calling number being identical; and
a switch associated with at least one of said first telephone and said second telephone to switch said at least one of said first telephone and said second telephone between an active mode and a standby mode prior to receiving an incoming call or making an outgoing call,
said first telephone and said second telephone configured to be simultaneously in active mode even though a call may already be placed on at least one of said first telephone and said second telephone.

17. The system of claim 16, further comprising:
said first telephone is in active mode;
said second telephone in standby mode;
said switch is located on at least said first telephone, and where said switch is configured to place said first telephone on standby mode and said second telephone on active mode.

18. The system of claim 16 where said switch accommodates redirection of one of an incoming call, outgoing call, and of a current call from one of said first telephone and said second telephone to another of said first telephone and said second telephone where said first telephone and said second telephone are both at least momentarily simultaneously in active mode.

19. The system of claim 18, where said switch sends a signal to one of said first telephone and said second telephone to place one of said first telephone and said second telephone in standby mode.

20. The system of claim 16, where said at least one of said first telephone and said second telephone is in active mode and said switch is configured to place at least one of said first telephone and said second telephone in standby mode and placing a second of said first Telephone and said second telephone in active mode.

21. A telephone communication system, comprising:
N telephones configured to be placed in both active mode and alternatively in stand-by mode where N is at least two;
each of said N telephones sharing an identical calling number;
a switch configured to activate one of said N telephones to be an active mode telephone prior to making an outgoing call or taking an incoming call, and placing on standby all N−1 telephones such that there is at least one standby mode telephone not otherwise activated, where redirection of a call from said active mode telephone to said at least one standby mode telephone occurs where said active mode telephone and said standby mode telephone are both at least simultaneously in active mode.

22. The system of claim 21 where said redirection of a call includes redirection of an incoming call.

23. The system of claim 21 where said redirection of a call includes redirection of a current call.

24. The system of claim 21 where redirection of a call from said active mode telephone to said at least one standby mode telephone originates from activating a switch from said at least one standby mode telephone.

25. The system of claim 21 where redirection of a call from said active mode telephone to said at least one standby mode telephone is activated by entry of a personal identification number at said at least one standby mode telephone.

26. The system of claim 14 where said redirection of a call includes redirection of an outgoing call.

27. A telephone system comprising:
- at least two telephones, each of said phones configured to be placed in either active mode or standby mode;
- each of said phones sharing an identical calling number; and
- a switch operable with a personal identification number associated with at least one of said at least two telephones to switch said at least one of said two telephones between a standby mode and an active mode prior to making an outgoing call or taking an incoming call, said at least two telephones being at least momentarily simultaneously in active mode during a switch of a call.

28. A telephone system comprising:
- a first telephone and a second telephone, each of said first telephone and said second telephone configured to be placed in either active mode or standby mode;
- each of said first telephone and said second telephone having one and only one active calling number, said calling number being identical; and
- a switch associated with at least one of said first telephone and said second telephone to switch said at least one of said first telephone and said second telephone between an active mode and a standby mode, said first telephone and said second telephone configured to be simultaneously in active mode before a call, while there is an incoming or outgoing call, during a call, or after a call.

* * * * *